Oct. 22, 1963 C. STACKAWICZ 3,107,424
CABLE GRIPPING AND SHEATH CUTTING TOOL
Filed Jan. 16, 1963
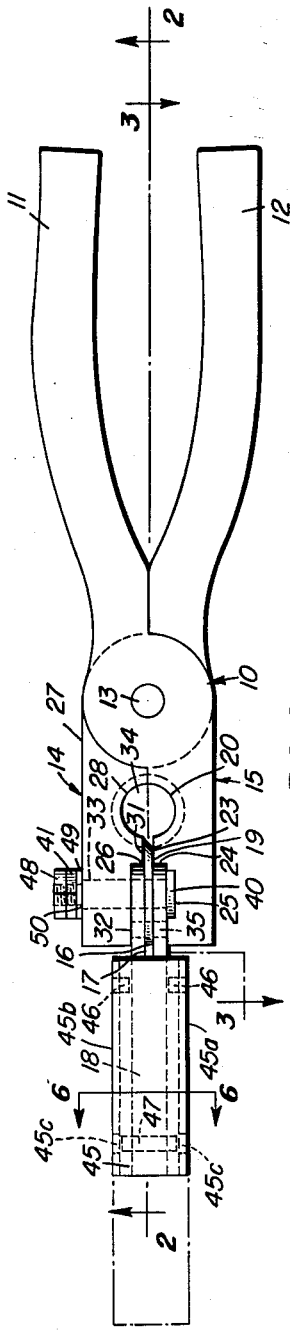
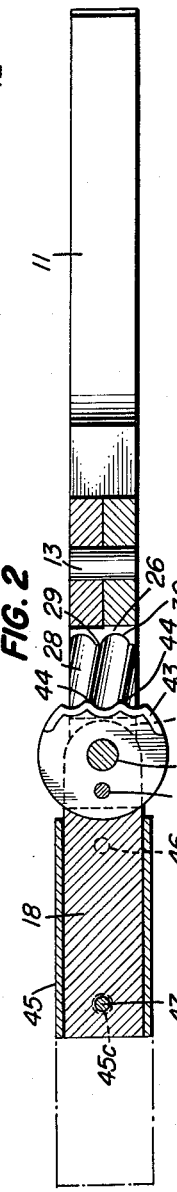
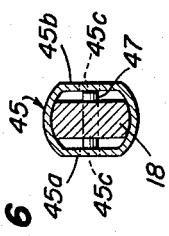
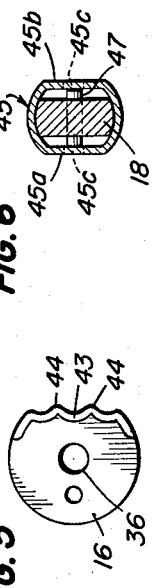
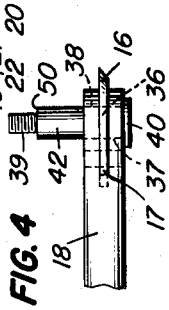
INVENTOR
Carl Stackawicz
BY
ATTORNEY United States Patent Office 3,107,424
Patented Oct. 22, 1963

3,107,424
CABLE GRIPPING AND SHEATH CUTTING TOOL
Carl Stackawicz, 73 N. Midland Ave., Kearny, N.J.
Filed Jan. 16, 1963, Ser. No. 251,812
3 Claims. (Cl. 30—90.5)

The present invention relates to gripping and cutting tools and, more especially, to ply gripping tools which are adapted to cut through a convolution of the sheath of a BX cable.

An object of this invention is to provide a gripping and cutting tool having jaws which may be opened at the forward end of the tool on the opposite side of a pivot from jaw handles of the tool, and which tool may be easily manipulated into a working position relative to a convolution of a BX cable sheath and is well oriented relative to the cable and has good mechanical advantage for the convolution to be gripped by the jaws and severed by a cutter available between the jaws on movement of a cutter operating arm extending outside of the jaws.

Another object of this invention is the provision of a gripping and cutting tool of the character indicated wherein the cutter is initially adjacent to the location where the sheath of the cable is to be gripped, and then is movable to cut a convolution of the sheath after the sheath is in full grip of the jaws.

Another object is the provision of a gripping and cutting tool of the character indicated in which the cutter severs a convolution of the sheath of a BX cable without any substantial impairment of insulation on wire inside the sheath.

A further object is to provide a gripping and cutting tool of the character indicated in which the cutter and its arm have a pivot on one of the jaws and the cutter arm and jaw handles share mechanical advantage about the cutter pivot when the cutter is being moved by having an operator exert force favoring the movemnet of the cutter while grasping the cutter arm and jaw handles.

Another object is that of providing a cutting and gripping tool of the character indicated, in which the jaws of the tool form an opening having its axis extending laterally of the jaws to receive the sheath of the cable, with the jaws at the opening substantially conforming to the external contour of a length of the sheath for the sheath to be gripped and a convolution thereof cut by operation of the cutter.

A further object of this invention is to provide a cutting and gripping tool of the character indicated wherein the cutting edge of the cutter is contiguous to the lateral opening formed by the jaws and is moveable into the opening to cut a convolution of the sheath after the sheath is in full grip of the jaws.

Another object of this invention is the provision of a gripping and cutting tool of the character indicated wherein the cutter has a cutting edge forward of the location where the sheath is gripped by the jaws and movable between the jaws to sever a convolution of the sheath.

Another object of this invention is to provide a gripping and cutting tool of the character indicated in which the cutter is rotatable on its pivot between the jaws of the tool in either of opposite directions for severing a convolution of BX cable securely held between the jaws.

A further object is that of providing a gripping and cutting tool of the character indicated in which the cutter is removable from the tool to enable replacement or sharpening of the cutter.

Other objects in part will be obvious and in part pointed out more fully hereinafter.

In the accompanying drawing representing a preferred embodiment of the present invention:

FIGURE 1 is a view in side elevation of a gripping and cutting tool in its fully closed position;

FIGURE 2 is a cross-sectional view taken along the line 2—2 in FIGURE 1;

FIGURE 3 is a cross-sectional view taken along the line 3—3 in FIGURE 1 with the cutter and operating arm removed;

FIGURE 4 is a detail view of the operating arm and the cutter;

FIGURE 5 is a detail view of the cutter; and

FIGURE 6 is a transverse cross-section taken through the operating arm and hand grip of the tool on line 6—6 in FIGURE 1.

Referring now more particularly to the drawing, there is illustrated a ply gripping tool 10 comprising handles 11 and 12. The handles are interconnected at their inner ends by a handle pivot 13. Opposed upper and lower jaws 14 and 15 form extensions of the handles on the opposite side of the pivot 13 from the handles. The jaw 14 is an integral extension of handle 12, and the jaw 15 is an integral extension of handle 11. The jaw 14 carries a cutter 16 which is disposed in an inner end slot 17 of operating arm 18.

The jaw 15 has an inner surface 19 which is provided with a gripping face 20. The gripping face 20 generally conforms to cylindrical curvature and advantageously has a helical facial contour comprising alternating ridges 21 and valleys 22 which lengthwise are of helical curvature about an axis extending transverse to jaw 15. The contour of the gripping face 20 is thus the female of a portion of the external contour of a BX cable sheath. The inner surface 19 has a relieved portion 23 extending away from the gripping face 20 on the opposite side of this gripping face from the handle pivot 13. The relieved portion 23 is stepped at 24 away from the longitudinal center line of the tool and thence extends to the outer end of the jaw. Between the step 24 and the outer end, the corresponding jaw 15 of the relieved portion 23 is provided with a cavity 25, the purpose of which will be hereinafter more fully explained.

The jaw 14 has an inner surface 26 and an outer surface 27. The inner surface is provided with a laterally extending gripping face 28 which generally conforms to cylindrical curvature and has a helical facial contour comprising ridges 29 and valleys 30 which lengthwise are of helical curvature about an axis extending transverse to jaw 14. The contour of gripping face 28 is thus the female of the external contour of a BX cable sheath. The inner surface 26 has a relieved portion 31 extending away from the gripping face 28 on the opposite side of the latter gripping face from the handle pivot 13. The relieved portion 31 is stepped at 32 away from the longitudinal center line of the tool and thence extends to the outer end of the jaw 14. An aperture 33 is formed through a jaw 14 and extends from the outer surface thereof to the relieved portion 31 so as to have axial alignment with cavity 25 in the closed positions of jaws 14 and 15.

The jaw 14 supports the operating arm 18 carrying a cutter in the slot 17 formed at the end of the arm. The cutter 16 and the arm 18 are disposed on the opposite side of the gripping face 28 from the handle pivot 13. A pin 35 extends through the arm and through the cutter to interconnect the arm with the cutter. The pin provides a friction fit so that the pin can be removed to disassemble the cutter from the arm; however, it is to be understood that the cutter in certain embodiments in accordance with the present invention is fixed to the arm by initially being integral or by welding, riveting, or the like.

The cutter 16 is provided centrally with an aperture 36 which is in alignment with corresponding apertures 37 and 38 through the operating arm. The apertures 36, 37, and 38 are positioned in axial alignment with aperture 33 through the jaw 14, and a bolt 39 having a head 40 is inserted through the apertures. The bolt is secured to the jaw 14 by a nut 41 and a superimposed jamb nut 48, and the bolt shank is stepped at 50 under the nut 41. A bearing washer 49 is received on the shank to the step and bears against the step and the outside surface 27 of jaw 14 as well as against the retaining nut 41. The shank of the bolt thus provides a cutter pivot 42 for rotation of the cutter and handle about the pivot. The cavity 25 accommodates the head 40 when the jaws are in closed position.

The operating arm and cutter can be removed from the jaw 14 simply by removing the nut and retracting the bolt. In this manner, the cutter can easily be sharpened or can be replaced with a new cutter and operating arm. In the instance of having the cutter removable from the operating arm, the cutter can be replaced by substituting another cutter.

The cutter 16 (see FIGURE 5) is generally in the shape of a disc which is provided with a sharp cutting edge 43. The cutting edge includes a plurality of spaced projections 44. When the operating arm and the cutter are assembled to the jaw 14, the cutting edge is disposed adjacent the gripping face 28. As is seen from FIGURE 2, the projections 44 on the cutting edge are in substantial alignment with the ridges 29 along the forward side of the gripping face.

The relative position of the jaws when the jaws are in a closed position is illustrated at FIGURE 1. It is seen that the gripping faces 20 and 23 of the two jaws cooperate to form an opening 34. The opposed ridges and valleys in the two jaws so cooperate as to provide a surface around the opening 34 and provide a contour corresponding to the helical facial contour of a BX cable. This is advantageous to prevent relative axial movement of a section of cable which is gripped by the jaws within the opening between the jaws. In the closed positions of jaws 14 and 15 the relieved portions 23 and 31 cooperate adjacent to the opening 34 to provide a relatively narrow gap in which the cutter 16 is received, and the jaws outward from the steps 24 and 32 cooperate to form a relatively wide gap accommodating the operating arm 18.

It is beneficial to provide positive means to assure a slight clearance or low pressure contact between the inner surfaces of jaws 14 and 15 and the adjacent surfaces of the cutter and the operating arm when the jaws are in closed position and the cable sheath is firmly gripped by the jaws. Thus, the inner surfaces 19 and 26 of the two jaws contact each other between the opening 34 and the handle pivot 13 to stop further closing of the jaws once a predetermined closing and cable sheath gripping position has been reached by the jaws. It is to be understood, however, that still in accordance with the present invention other means may be provided or even the cable itself may serve to prevent any further closing of the jaws once the jaws have reached a closed gripping position.

The operating arm 18 is advantageously equipped with an outer sleeve 45 to afford a grip on the arm. As seen at FIGURES 1 and 6, the sleeve comprises a hollow tubular member having generally parallel opposed flat sides 45a and 45b and inwardly projecting opposed stop pins 46 fixed to the respective flat sides adjacent to the end of the tubular member which is most proximate to the outer ends of the jaws 14 and 15. The sleeve is slidable longitudinally on the arm and is thus guided by the arm, such as to the outer extended position indicated by dotted lines in FIGURES 1 and 2, to adjust the leverage of the arm by which the cutter 16 is to be rotated. The inner ends of pins 46 engage the ends of a stop pin 47, which has press fit in a corresponding aperture in the operating arm and terminates inside the sleeve, thus to stop the sleeve in the extended position of the sleeve. Stop pin 47 is conveniently installed in the operating arm by insertion through either of opposed openings 45c in the sleeve, each opening 45c having slightly a larger diameter than the pin 47 and the corresponding opening in the arm having a slightly smaller diameter than the pin thus to establish press fit.

Referring to operation of the tool 10, jaws 14 and 15 are opened by moving the outer ends of the handles 11 and 12 away from each other about the handle pivot 13. The cutter 16 is rotated about the cutter pivot 42 so that the projections 44 on the cutting edge 43 are in substantial alignment with the ridges 29 on the gripping face 28 of jaw 14 to which the cutter is attached. This alignment is desirable because, as is seen at FIGURE 2, there is now presented an unobstructed helical surface 28 which corresponds generally to the outer contour of a BX cable sheath while the projections 44 extend over the corresponding ends of the ridges 29. Jaw 15 is slipped underneath a BX cable and a section of cable is positioned against face 20 of the latter jaw. The particular section of the cable introduced to the face 20 illustratively is some six or eight inches from an end of the cable. After placing any desired section of the cable against the gripping face 20 or for that matter against gripping face 28, the jaws are pivoted to a closed position by operation of the handles 11 and 12. The contour of the gripping faces assures that the cable will be secured against relative axial movement. The operator may grasp handles 11 and 12 in one hand, leaving the other hand free to manipulate the cutter operating arm 18. The operating arm is moved in either of opposite directions to rotate the cutter 16 about its pivot 42 and the cutting edge 43 of the cutter 16 is thereby caused to move and sever a convolution of the cable sheath. The cutting edge 43 in passing through the convolution extends only slightly, if at all, beyond the inner surface of the cable sheath and thus remains out of any substantial contact with the insulation on wire within the sheath during the entire cutting operation. This feature is assured by the fact that the cutting edge 43 extends beyond the cutter pivot 42 radially as far as to the opening 34 measured in a direction from the cutter pivot normal to the axis of this opening plus substantially only the distance through an entire side of a convolution of a BX cable gripped by the jaws 14 and 15 in the opening.

This invention accordingly provides a simple ply gripping tool which is useful for severing a convolution of a BX cable sheath without disturbing the insulation of the underlying wire. The tool is further characterized by its maneuverability and is powerful for cutting in that the gripping handles share with the operating arm of the cutter to obtain good leverage.

As many possible embodiments of the invention may be made and as many possible changes may be made in the embodiments herein set forth, it will be distinctly understood that all matter described herein is to be interpreted as illustrative and not as a limitation.

I claim:

1. A ply gripping tool for BX cable to be gripped on the sheath thereof and cut through a convolution of the sheath, said gripping tool comprising a pair of handles, a handle pivot interconnecting said handles for said handles to be moved pivotally toward and away from each other, a pair of opposed jaws individually carried by said handles and extending on the opposite side of said handle pivot from said handles for said jaws to move pivotally with said handles, said jaws having opposed gripping faces thereon forming an opening having its axis disposed laterally of said jaws for a section of BX cable to be disposed between said jaws and gripped by said gripping faces, a cutter extending between said jaws on the opposite side of said opening from said handle pivot and having an arm extending outside said jaws, a cutter pivot on one of said jaws for said cutter to be rotated by operation of said arm when said jaws are gripping a section of a BX cable, said arm supporting an extensible hand grip slidably thereon, and said gripping tool further including means interlocking said arm and hand grip to prevent escape of said hand grip from said arm in an extended position of said hand grip relative to said arm, and said cutter having a cutting edge movable into said opening on operation of said arm and said edge extending beyond said cutter pivot radially as far as to said opening measured in a direction from said cutter pivot normal to the axis of said opening plus substantially only the distance through an entire side of the convolution of a BX cable, for severing the convolution when a section of a BX cable is in said opening and gripped by said jaws.

2. A ply gripping tool for BX cable to be gripped on on the sheath thereof and cut through a convolution of the sheath, said gripping tool comprising a pair of handles and opposed jaws carried by said handles, a pivot interconnecting said jaws for said jaws to be moved pivotally toward and away from each other by operation of said handles, said jaws having opposed gripping faces thereon forming an opening having its axis disposed laterally of said jaws and said gripping faces having ridges and valleys for a section of BX cable to be disposed between said jaws in conformity with said ridges and valleys and gripped by said gripping faces, a cutter extending between said jaws on the opposite side of said opening from said handle pivot and having an arm extending outside said jaws, a cutter pivot on one of said jaws for said cutter to be rotated by operation of said arm when said jaws are gripping a section of a BX cable, said cutter having a projection initially over the end of a corresponding one of said ridges between an adjacent pair of said valleys on said one of said jaws and said projection having opposite sides immediately outside said pair of valleys initially for the cable to be placed in said jaw, and said cutter having a cutting edge extending on both of said opposite sides of said projection and rotatable in either of opposite directions about said cutter pivot into said opening as far as to said opening measured in a direction from said cutter pivot normal to the axis of said opening plus substantially only the distance through an entire side of either of adjacent convolutions of a BX cable when a section of a BX cable is in said opening and gripped by said jaws, whereby said cutting edge severs a convolution of a BX cable in said opening and gripped by said jaws when said cutter is rotated in either direction about said cutter pivot by operation of said arm.

3. A ply gripping tool for BX cable to be gripped on the sheath thereof and cut through a convolution of the sheath, said gripping tool comprising a pair of handles and opposed jaws carried by said handles, a pivot interconnecting said jaws for said jaws to be moved pivotally toward and away from each other by operation of said handles, said jaws having opposed gripping faces thereon forming an opening having its axis disposed laterally of said jaws and said gripping faces having ridges and valleys for a section of BX cable to be disposed between said jaws in conformity with said ridges and valleys and gripped by said gripping faces, a cutter extending between said jaws on the opposite side of said opening from said handle pivot and having an arm extending outside said jaws, a cutter pivot on one of said jaws for said cutter to be rotated by operation of said arm when said jaws are gripping a section of a BX cable, said cutter having projections initially over ends of corresponding ones of said ridges on opposite sides of an intermediate one of said valleys on said one of said jaws and said projections having adjacent sides immediately outside said one of said valleys initially for the cable to be placed in said jaw, and said cutter having a cutting edge extending on both of said adjacent sides of said projections and rotatable in either of opposite directions about said cutter pivot into said opening as far as to said opening measured in a direction from said cutter pivot normal to the axis of said opening plus substantially only the distance through an entire side of a convolution of a BX cable when a section of a BX cable is in said opening and gripped by said jaws, whereby said cutting edge severs a convolution of a BX cable in said opening and gripped by said jaws when said cutter is rotated in either direction about said cutter pivot by operation of said arm.

References Cited in the file of this patent

UNITED STATES PATENTS

| | | |
|---|---|---|
| 2,031,470 | Eck et al. | Feb. 18, 1936 |
| 2,493,941 | Belden | Jan. 10, 1950 |
| 2,551,401 | Underhill | May 1, 1951 |